United States Patent
Guo et al.

(10) Patent No.: US 12,389,463 B2
(45) Date of Patent: Aug. 12, 2025

(54) CHANNEL ACCESS METHOD FOR MULTI-LINK DEVICE, AND RELATED APPARATUS

(71) Applicant: HUAWEI TECHNOLOGIES CO., LTD., Guangdong (CN)

(72) Inventors: Yuchen Guo, Shenzhen (CN); Yunbo Li, Shenzhen (CN); Yiqing Li, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 18/067,355

(22) Filed: Dec. 16, 2022

(65) Prior Publication Data

US 2023/0121480 A1   Apr. 20, 2023

Related U.S. Application Data

(63) Continuation of application No. PCT/CN2021/100783, filed on Jun. 18, 2021.

(30) Foreign Application Priority Data

Jun. 18, 2020   (CN) .......................... 202010562039.8

(51) Int. Cl.
    *H04W 74/08*      (2024.01)
    *H04W 74/0833*    (2024.01)
(52) U.S. Cl.
    CPC ................................ *H04W 74/085* (2013.01)
(58) Field of Classification Search
    CPC .................................................. H04W 74/085
    (Continued)

(56) References Cited

U.S. PATENT DOCUMENTS

| 2016/0316470 A1 | 10/2016 | Wong et al. |
| 2022/0159718 A1* | 5/2022 | Fang ..................... H04W 76/15 |

(Continued)

FOREIGN PATENT DOCUMENTS

| CN | 106851848 A | 6/2017 |
| CN | 107852752 A | 3/2018 |

(Continued)

OTHER PUBLICATIONS

International Search Report and Written Opinion in International Appln. No. PCT/CN2021/100783, mailed on Sep. 18, 2021, 14 pages (with English translation).

(Continued)

*Primary Examiner* — Faisal Choudhury
(74) *Attorney, Agent, or Firm* — Fish & Richardson P.C.

(57) ABSTRACT

Example channel access methods and apparatus are described. One example method includes performing first channel contention by a multi-link device on a first link, where an initial value of a backoff counter in the first channel contention is determined based on a first value of a contention window. The multi-link device may perform second channel contention on the first link when a value of the backoff counter becomes 0 in the first channel contention and when the multi-link device does not perform transmission on the first link. An initial value of the backoff counter in the second channel contention is determined based on a second value of the contention window, and the second value is equal to the first value or a minimum value of the contention window.

16 Claims, 7 Drawing Sheets

(58) Field of Classification Search
USPC .......................................................... 370/329
See application file for complete search history.

(56) References Cited

U.S. PATENT DOCUMENTS

| 2022/0394756 A1* | 12/2022 | Jang | .................. H04W 74/0808 |
| 2022/0418018 A1* | 12/2022 | Jang | ...................... H04W 76/15 |
| 2023/0122740 A1* | 4/2023 | Kim | ...................... H04W 76/15 370/329 |

FOREIGN PATENT DOCUMENTS

| CN | 109792776 A | 5/2019 |
| KR | 20180120202 A | 11/2018 |
| WO | 2016049874 A1 | 4/2016 |
| WO | 2019099268 A1 | 5/2019 |

OTHER PUBLICATIONS

Office Action in Indian Appln. No. 202217076828, mailed on Feb. 20, 2024, 6 pages (with English translation).

* cited by examiner

PIFS: point coordination function interframe space

CHANNEL ACCESS METHOD FOR MULTI-LINK DEVICE, AND RELATED APPARATUS

CROSS-REFERENCE TO RELATED APPLICATIONS

This application is a continuation of International Patent Application No. PCT/CN2021/100783, filed on Jun. 18, 2021, which claims priority to Chinese Patent Application No. 202010562039.8, filed on Jun. 18, 2020. The disclosures of the aforementioned applications are hereby incorporated by reference in their entireties.

TECHNICAL FIELD

This application relates to the field of wireless communication technologies, and in particular, to a channel access method for a multi-link device, and a related apparatus.

BACKGROUND

With development of wireless communication technologies, more wireless communication devices support multi-link communication, for example, communication performed in 2.4 GHz, 5 GHz, and 6 GHz frequency bands simultaneously, or communication performed on different channels in a same frequency band simultaneously. Such a wireless communication device is usually referred to as a multi-link device (multi-link device, MLD). It is clearly that a multi-link device can perform parallel communication on a plurality of links, so that a transmission rate is greatly increased.

Although a multi-link device can increase a transmission rate by performing parallel communication on a plurality of links, when some multi-link devices perform sending on one link, sent energy leaks to another link, and self-interference is caused. As a result, the multi-link device cannot correctly demodulate, on the another link, a data packet that needs to be received. In other words, the multi-link device does not support simultaneous transmit and receive (simultaneous transmit and receive, STR) on a plurality of links. Therefore, for a non-simultaneous transmit and receive (non-STR) multi-link device, when channel contention is performed on two links, and sending is performed on one link on which a backoff counter becomes 0, energy sent on the link leaks to the other link, and consequently, channel contention continues on the other link because a channel is busy. As a result, only one link can be used for transmission.

Currently, to eliminate interference between two links, a multi-link device may perform channel contention on one link, and after a backoff counter backs off to 0, wait for channel contention on the other link rather than performing data transmission, so that channel contention on the other link can be normally performed. However, because a multi-link device does not perform data transmission after performing channel contention on a link and backing off to 0, how the multi-link device performs channel access on the link again becomes an urgent problem to be resolved.

SUMMARY

Embodiments of this application provide a channel access method for a multi-link device, and a related apparatus, so that when the multi-link device backs off to 0 on a link but does not perform transmission on the link, balance between a backoff time and a contention collision probability can be achieved by performing channel contention/channel access on the link again, and setting a value of a contention window to remain unchanged or setting a value of a contention window to a minimum value.

The following describes this application from different aspects. It should be understood that mutual reference may be made between the following implementations and beneficial effects of the different aspects.

According to a first aspect, an embodiment of this application provides a channel access method applied to a multi-link device. The method includes: The multi-link device performs first channel contention on a first link. When a value of a backoff counter becomes 0 in the first channel contention and the multi-link device does not perform transmission on the first link, the multi-link device may perform second channel contention on the first link. An initial value of the backoff counter in the first channel contention is determined based on a first value of a contention window, and an initial value of the backoff counter in the second channel contention is determined based on a second value of the contention window. The second value may be equal to the first value, or the second value is a minimum value of the contention window.

Optionally, STR is not supported between the first link and a second link.

Optionally, a reason for which the multi-link device does not perform transmission on the first link includes: After the value of the backoff counter becomes 0 in the first channel contention, the multi-link device suspends the first link, and waits for channel contention on the second link. When a time for which the first link waits for channel contention on the second link exceeds a preset time, if a state of the second link is still a busy state, it indicates that a backoff counter on the second link cannot back off to 0 for a long time. In this case, the multi-link device performs channel contention on the first link again, that is, the multi-link device performs the second channel contention on the first link.

Optionally, a reason for which the multi-link device does not perform transmission on the first link includes: After the value of the backoff counter becomes 0 in the first channel contention, the multi-link device receives a data packet on the second link, and a length of the data packet exceeds a preset time. It indicates that a comparatively long network allocation vector is set on the second link. In this case, the multi-link device performs channel contention on the first link again, that is, the multi-link device performs the second channel contention on the first link.

According to this solution, when the multi-link device backs off to 0 on a link but does not perform transmission on the link, balance between a backoff time and a contention collision probability can be achieved by performing channel contention/channel access on the link again, and setting a value of a contention window to remain unchanged or setting a value of a contention window to a minimum value CWmin.

With reference to the first aspect, in a possible design, before the multi-link device performs the second channel contention on the first link, the method further includes: The multi-link device detects a state of the first link in a first time period. If the state of the first link in the first time period is an idle state, the multi-link device uses the first value of the contention window during the first channel contention as the second value of the contention window during the next channel contention on the first link, or sets the second value of the contention window to the minimum value of the contention window. The first time period may be a clear channel assessment time, for example, 4 $\mu$s or 9 $\mu$s.

Optionally, if the state of the first link in the first time period is a busy state, the multi-link device increases the first value of the contention window, and uses an increased value as the second value of the contention window.

According to this solution, after the backoff counter backs off to 0 in the first channel contention, the state of the first link is determined, to estimate whether transmission on the first link succeeds, and a value of the contention window is set based on an estimation result. In this way, a size of the contention window can be adjusted more accurately and properly, thereby further balancing a backoff time and a contention collision probability.

With reference to the first aspect, in a possible design, before the multi-link device performs the second channel contention on the first link, the method further includes: The multi-link device performs channel contention on the second link, and detects a state of the first link when a value of a backoff counter becomes 0 in the channel contention. If the state of the first link is the busy state, the multi-link device may suspend the second link, that is, perform no transmission on the second link. Only when the state of the first link changes from the busy state to the idle state, the multi-link device performs the second channel contention on the first link.

Optionally, the multi-link device detects a state of the second link when a value of the backoff counter becomes 0 in the second channel contention; and the multi-link device transmits data in parallel on the first link and the second link if the state of the second link is an idle state.

According to this solution, after the multi-link device backs off to 0 on the first link, in a process of waiting for channel contention on the second link, the state of the first link changes to the busy state, and when the multi-link device backs off to 0 on the second link, the first link is still in the busy state; after the state of the first link returns to the idle state, the multi-link device performs channel contention on the first link again, and after backing off to 0, transmits data in parallel on the first link and the second link. In this way, a peak transmission rate can be increased.

With reference to the first aspect, in a possible design, before the multi-link device performs the second channel contention on the first link, the method further includes: The multi-link device performs channel contention on the second link, and detects a state of the first link when a value of a backoff counter becomes 0 in the channel contention. The multi-link device may transmit data on the second link if the state of the first link is the busy state.

Optionally, the multi-link device performs the second channel contention on the first link only when the state of the first link changes from the busy state to the idle state. The multi-link device transmits data on the first link when a value of the backoff counter becomes 0 in the second channel contention.

According to this solution, after the multi-link device backs off to 0 on the first link, in a process of waiting for channel contention on the second link, the state of the first link changes to the busy state, and when the multi-link device backs off to 0 on the second link, the first link is still in the busy state; in this case, the multi-link device may directly transmit data on the second link. In this way, channel utilization can be improved.

According to a second aspect, an embodiment of this application provides a communication apparatus. The communication apparatus may be a multi-link device or a chip, such as a Wi-Fi chip, in a multi-link device, and includes:

a processing unit, configured to perform first channel contention on a first link, where an initial value of a backoff counter in the first channel contention is determined based on a first value of a contention window; and the processing unit is further configured to perform second channel contention on the first link when a value of the backoff counter becomes 0 in the first channel contention and the multi-link device does not perform transmission on the first link, where an initial value of the backoff counter in the second channel contention is determined based on a second value of the contention window, and the second value of the contention window is equal to the first value of the contention window, or the second value of the contention window is equal to a minimum value of the contention window.

With reference to the second aspect, in a possible design, that the multi-link device does not perform transmission on the first link includes: when a time for which the first link waits for channel contention on a second link exceeds a preset time, a state of the second link is a busy state.

With reference to the second aspect, in a possible design, that the multi-link device does not perform transmission on the first link includes: after the value of the backoff counter becomes 0 in the first channel contention, a length of a data packet received by the multi-link device on a second link exceeds a preset time.

With reference to the second aspect, in a possible design, simultaneous transmit and receive STR is not supported between the first link and the second link.

With reference to the second aspect, in a possible design, the processing unit is further configured to: detect a state of the first link in a first time period; and when the state of the first link in the first time period is an idle state, determine the first value of the contention window as the second value, or determine the second value of the contention window as the minimum value of the contention window.

With reference to the second aspect, in a possible design, the processing unit is further configured to: perform channel contention on the second link, and detect a state of the first link when a value of the backoff counter becomes 0 in the channel contention; and suspend the second link when the state of the first link is a busy state. The processing unit is configured to perform the second channel contention on the first link when the state of the first link changes from the busy state to the idle state.

With reference to the second aspect, in a possible design, the communication apparatus further includes a transceiver unit. The processing unit is further configured to detect, for the multi-link device, a state of the second link when a value of the backoff counter becomes 0 in the second channel contention. The transceiver unit is configured to transmit data in parallel on the first link and the second link when the state of the second link is an idle state.

With reference to the second aspect, in a possible design, the communication apparatus further includes a transceiver unit. The processing unit is further configured to perform channel contention on the second link, and detect a state of the first link when a value of the backoff counter becomes 0 in the channel contention. The transceiver unit is configured to transmit data on the second link when the state of the first link is a busy state.

According to a third aspect, an embodiment of this application provides another communication apparatus, which is specifically a multi-link device, including a processor. The processor is configured to support the multi-link device in performing corresponding functions in the method according to the first aspect. Optionally, the multi-link device may further include a memory. The memory is configured to be coupled to the processor, and stores program instructions and data that are necessary for the multi-link device.

Specifically, the processor is configured to: perform first channel contention on a first link, where an initial value of a backoff counter in the first channel contention is determined based on a first value of a contention window; and perform second channel contention on the first link when a value of the backoff counter becomes 0 in the first channel contention and the multi-link device does not perform transmission on the first link, where an initial value of the backoff counter in the second channel contention is determined based on a second value of the contention window, and the second value of the contention window is equal to the first value of the contention window, or the second value of the contention window is equal to a minimum value of the contention window.

Optionally, the multi-link device may further include a transceiver. The transceiver is configured to support communication between the multi-link device and another device, for example, transmit data in parallel on the first link and a second link when a state of the second link is an idle state, or transmit data on a second link when a state of the first link is a busy state.

According to a fourth aspect, an embodiment of this application provides a chip or a chip system, including a processing circuit. The processing circuit is configured to: perform first channel contention on a first link, where an initial value of a backoff counter in the first channel contention is determined based on a first value of a contention window; and perform second channel contention on the first link when a value of the backoff counter becomes 0 in the first channel contention and a multi-link device does not perform transmission on the first link, where an initial value of the backoff counter in the second channel contention is determined based on a second value of the contention window, and the second value of the contention window is equal to the first value of the contention window, or the second value of the contention window is equal to a minimum value of the contention window.

According to a fifth aspect, this application provides a computer-readable storage medium. The computer-readable storage medium stores instructions. When the instructions are run on a computer, the computer is enabled to perform the channel access method for a multi-link device according to the first aspect.

According to a sixth aspect, this application provides a computer program product including instructions. When the computer program product is run on a computer, the computer is enabled to perform the channel access method for a multi-link device according to the first aspect.

Through implementation of the embodiments of this application, when the multi-link device backs off to 0 on a link but does not perform transmission on the link, balance between a backoff time and a contention collision probability can be achieved by performing channel contention/channel access on the link again, and setting the value of the contention window to remain unchanged or setting the value of the contention window to the minimum value.

BRIEF DESCRIPTION OF DRAWINGS

To describe the technical solutions in the embodiments of this application more clearly, the following briefly describes the accompanying drawings used in describing the embodiments.

DESCRIPTION OF EMBODIMENTS

The following clearly describes the technical solutions in the embodiments of this application with reference to the accompanying drawings in the embodiments of this application.

For ease of understanding a channel access method for a multi-link device provided in the embodiments of this application, the following describes a system architecture and/or an application scenario of the channel access method for a multi-link device provided in the embodiments of this application. It can be understood that the system architecture and/or the scenario described in the embodiments of this application are/is intended to describe the technical solutions in the embodiments of this application more clearly, and do/does not constitute a limitation on the technical solutions provided in the embodiments of this application.

The embodiments of this application provide a channel access method applied to a non-simultaneous transmit and receive (non-STR) multi-link device, so that when the multi-link device backs off to 0 on a link but does not perform transmission on the link, balance between a backoff time and a contention collision probability can be achieved by performing channel contention/channel access on the link again, and setting a value of a contention window to remain unchanged or setting a value of a contention window to a minimum value. The channel access method may be implemented by a communication device in a wireless communication system or a chip or processor in a communication device. The communication device may be a wireless communication device that supports parallel transmission on a plurality of links. For example, the communication device may be referred to as a multi-link device or a multi-band device (multi-band device). Compared with a communication device that supports only single-link transmission, a multi-link device has higher transmission efficiency and a higher throughput rate.

A multi-link device includes one or more affiliated stations (affiliated STA). The affiliated station is a logical station, and may work on one link, in one frequency band, or on one channel. The affiliated station may be an access point (access point, AP) or a non-access point station (non-access point station, non-AP STA). For ease of description, in this application, a multi-link device whose affiliated station is an AP is referred to as a multi-link AP, a multi-link AP device, or an AP multi-link device (AP multi-link device, AP MLD), and a multi-link device whose affiliated station is a non-AP STA is referred to as a multi-link non-AP, a multi-link non-AP device, or a non-AP multi-link device (Non-AP multi-link device, Non-AP MLD).

Optionally, one multi-link device may include a plurality of logical stations, and each logical station works on one link, but a plurality of logical stations are allowed to work on one link.

Figure 1:
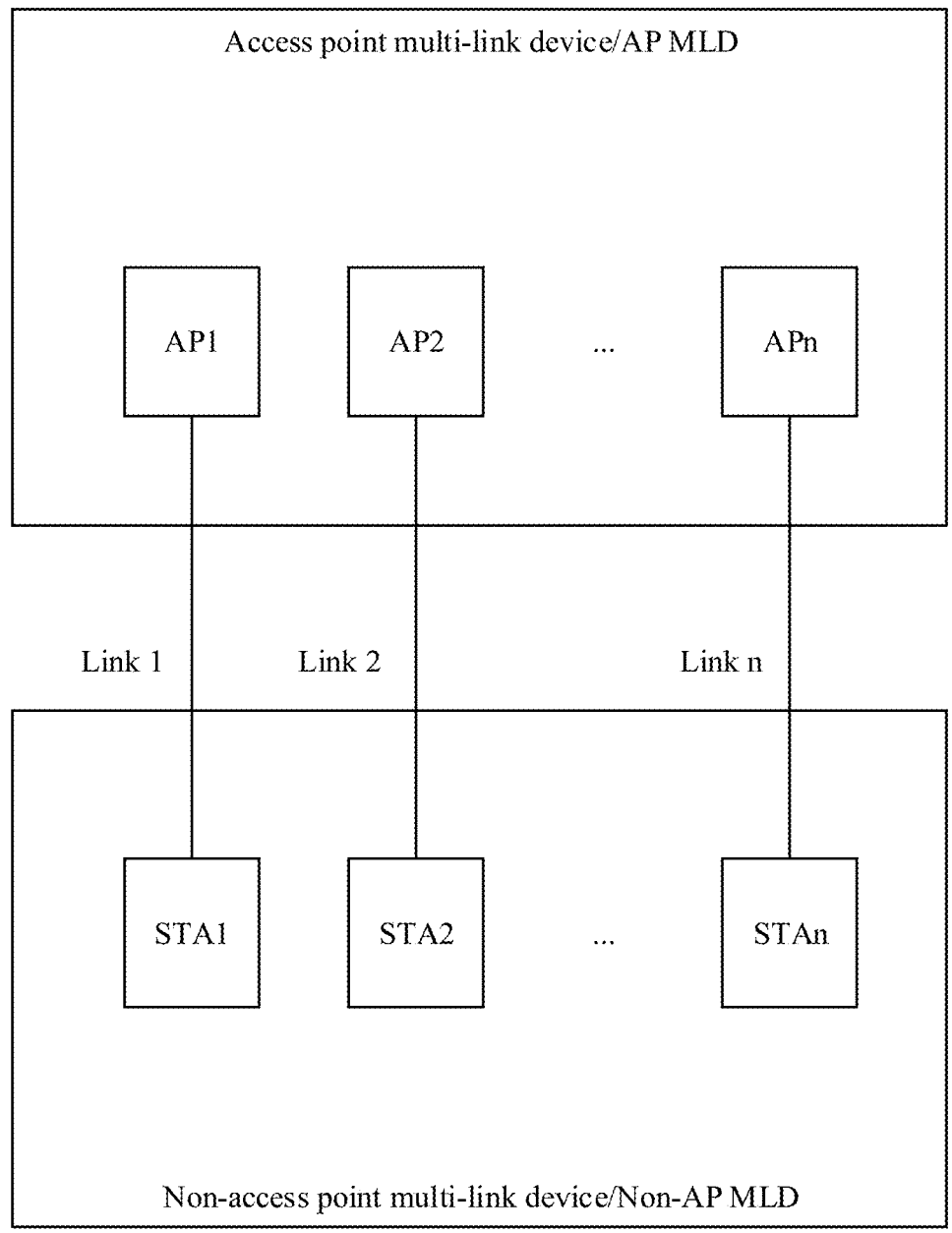
FIG. 1 is a schematic diagram of communication between a non-AP MLD and an AP MLD according to an embodiment of this application.

Optionally, one or more non-AP STAs in a non-AP MLD may establish an association relationship with one or more APs in an AP MLD, and then communicate with the one or more APs. FIG. 1 is a schematic diagram of communication between a non-AP MLD and an AP MLD according to an embodiment of this application. As shown in FIG. 1, the AP MLD includes an AP1, an AP2, . . . , and an APn, and the non-AP MLD includes a STA1, a STA2, . . . , and a STAn. The AP MLD and the non-AP MLD may communicate in parallel on a link 1, a link 2, . . . , and a link n. An association relationship is established between the STA1 in the non-AP MLD and the AP1 in the AP MLD, an association relationship is established between the STA2 in the non-AP MLD and the AP2 in the AP MLD, an association relationship is established between the STAn in the non-AP MLD and the APn in the AP MLD, and so on.

Optionally, a multi-link device may implement wireless communication according to a protocol of the IEEE 802.11 series, for example, comply with a station with an extremely high throughput (extremely high throughput, EHT) or comply with a station that is based on IEEE 802.11be or compatible with IEEE 802.11be, to communicate with another device.

Figure 2:
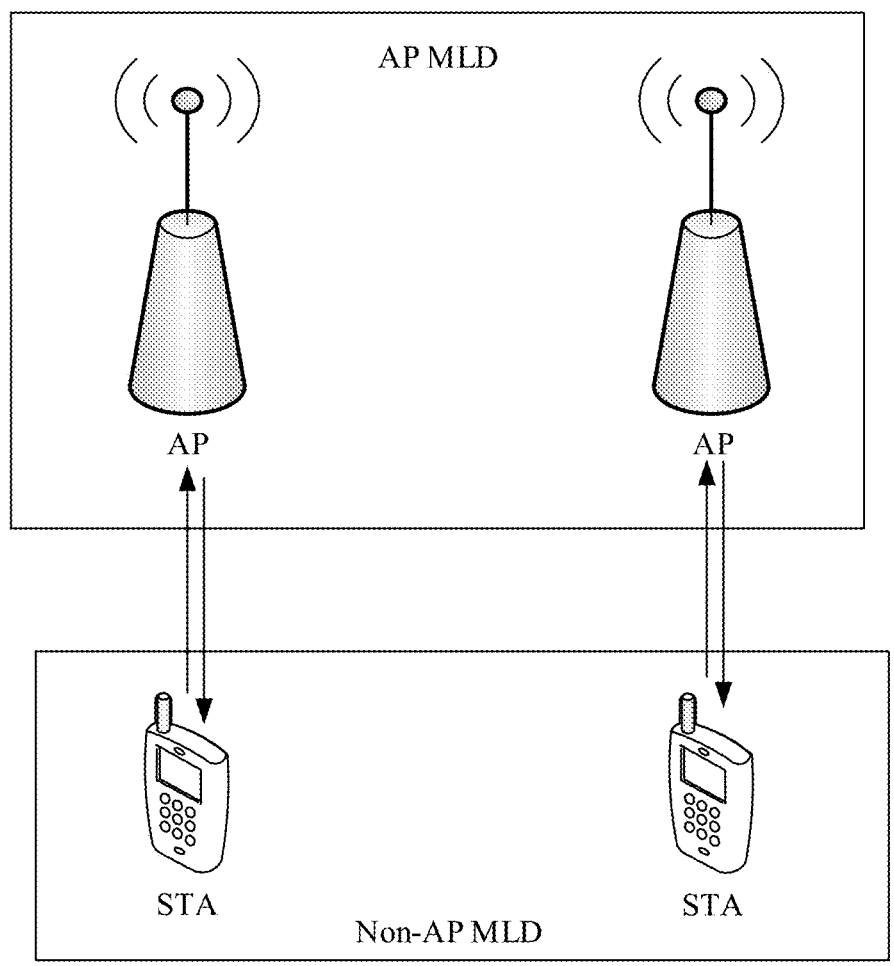
FIG. 2 is a schematic diagram of an architecture of a wireless communication system according to an embodiment of this application.

The channel access method for a multi-link device provided in the embodiments of this application may be applied to a wireless local area network (wireless local area network, WLAN). FIG. 2 is a schematic diagram of an architecture of a wireless communication system according to an embodiment of this application. As shown in FIG. 2, the wireless communication system includes at least one AP MLD and at least one non-AP MLD. The AP MLD is a multi-link device that provides a service for the non-AP MLD. The non-AP MLD and the AP MLD may communicate with each other on a plurality of links. One AP in the AP MLD may communicate with one STA in the non-AP MLD on one link. It can be understood that quantities of AP MLDs and non-AP MLDs in FIG. 2 are merely examples.

For example, a multi-link device (which herein may be a non-AP MLD or may be an AP MLD) is an apparatus with a wireless communication function. The apparatus may be an entire device, or may be a chip or a processing system installed in an entire device, or the like. The device in which the chip or the processing system is installed may implement the method and functions in the embodiments of this application under control by the chip or the processing system. For example, a non-AP multi-link device in the embodiments of this application has a wireless transceiver function, may support the 802.11 series protocols, and may communicate with an AP multi-link device or another non-AP multi-link device. For example, a non-AP multi-link device is any user communication device that allows a user to communicate with an AP and thereby communicate with a WLAN. For example, a non-AP multi-link device may be user equipment that can be connected to a network, such as a tablet computer, a desktop computer, a laptop computer, a notebook computer, an ultra-mobile personal computer (ultra-mobile personal computer, UMPC), a handheld computer, a netbook, a personal digital assistant (personal digital assistant, PDA), or a mobile phone, may be an internet of things node in the internet of things, or may be a vehicle-mounted communication apparatus in the internet of vehicles. Non-AP multi-link devices may alternatively be chips and processing systems in the foregoing terminals. An AP multi-link device may be an apparatus that provides a service for a non-AP multi-link device, and may support the 802.11 series protocols. For example, an AP multi-link device may be a communication entity, such as a communication server, a router, a switch, or a bridge. Alternatively, AP multi-link devices may include macro base stations, micro base stations, relay stations, and the like in various forms. Certainly, AP multi-link devices may alternatively be chips and processing systems in these devices in various forms.

It can be understood that a multi-link device may support high-rate and low-latency transmission. With continuous evolution of application scenarios of a wireless local area network, a multi-link device may be further applied to more scenarios, for example, a sensor node (for example, a smart water meter, a smart electricity meter, or a smart air detection node) in a smart city, a smart device (for example, a smart camera, a projector, a display, a TV, a stereo, a refrigerator, or a washing machine) in a smart household, a node in the internet of things, an entertainment terminal (for example, a wearable device such as an AR or a VR), a smart device (for example, a printer or a projector) in a smart office, an internet of vehicles device in the internet of vehicles, and some infrastructures (for example, a vending machine, a self-service navigation station of a supermarket, a self-service cash register device, and a self-service ordering machine) in daily life scenarios. A specific form of a multi-link device is not limited in the embodiments of this application, and descriptions herein are merely examples. The 802.11 protocol may be a protocol supporting 802.11be or compatible with 802.11be.

Figure 3A:
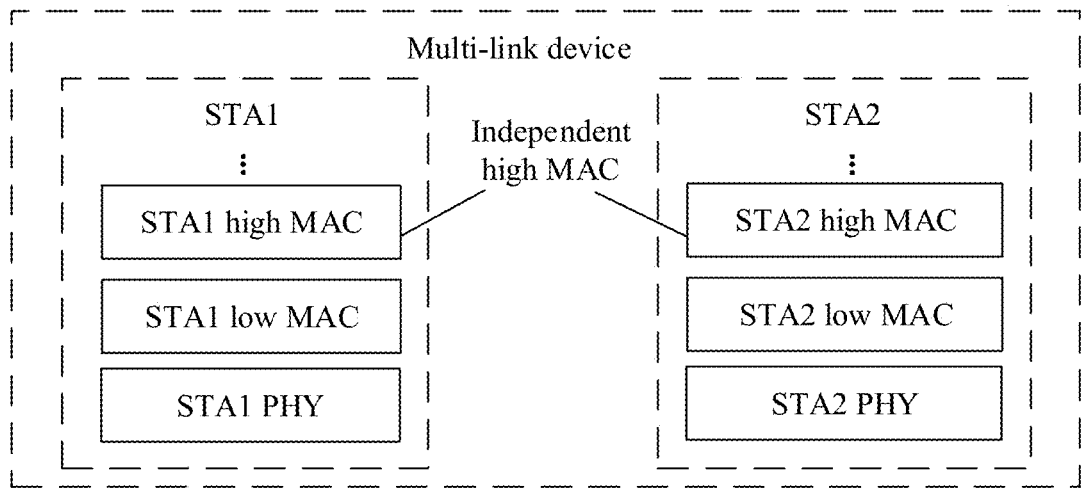
FIG. 3a is a schematic diagram of a structure of a multi-link device according to an embodiment of this application.
Figure 3B:
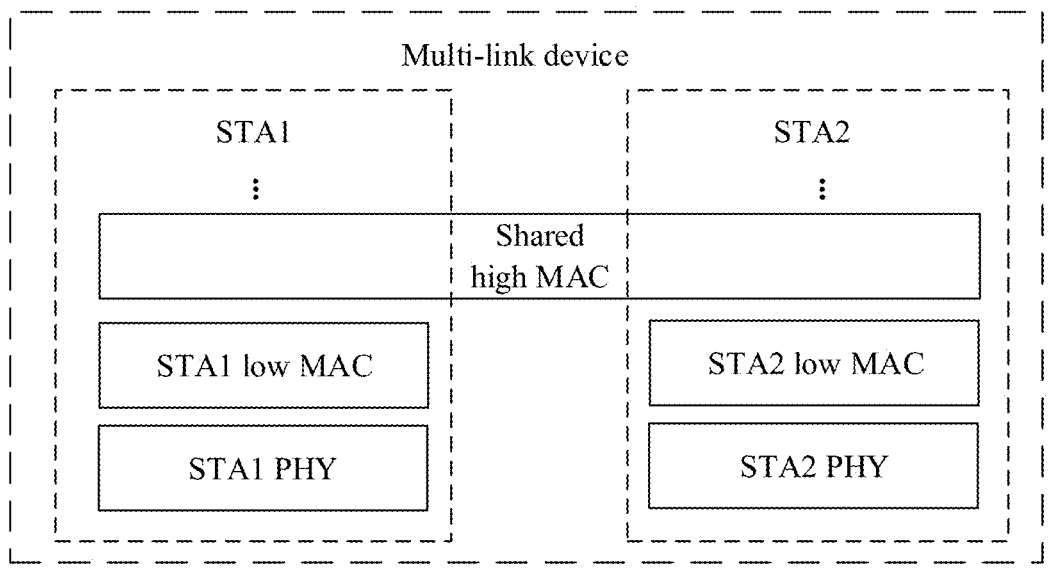
FIG. 3b is a schematic diagram of another structure of a multi-link device according to an embodiment of this application.

Optionally, FIG. 3a is a schematic diagram of a structure of a multi-link device according to an embodiment of this application. The IEEE 802.11 standard focuses on an 802.11 physical layer (physical layer, PHY) part and a media access control (media access control, MAC) layer part in a multi-link device. As shown in FIG. 3a, a plurality of STAs included in the multi-link device are independent of each other at a low MAC (low MAC) layer and a PHY layer, and are also independent of each other at a high MAC (high MAC) layer. FIG. 3b is a schematic diagram of another structure of a multi-link device according to an embodiment of this application. As shown in FIG. 3b, a plurality of STAs included in the multi-link device are independent of each other at a low MAC (low MAC) layer and a PHY layer, and share a high MAC (high MAC) layer. Certainly, a non-AP multi-link device may use a structure in which high MAC layers are independent of each other, or may use a structure in which a high MAC layer is shared. Similarly, an AP multi-link device may use a structure in which a high MAC layer is shared, or may use a structure in which high MAC layers are independent of each other. A schematic diagram of an internal structure of the multi-link device is not limited in the embodiments of this application. FIG. 3a and FIG. 3b are merely examples for description. For example, the high MAC layer or the low MAC layer may be implemented by one processor in a chip system of the multi-link device, or may be separately implemented by different processing modules in a chip system.

For example, the multi-link device in the embodiments of this application may be a single-antenna device, or may be a multi-antenna device, for example, a device with more than two antennas. A quantity of antennas included in the multi-link device is not limited in the embodiments of this application. In the embodiments of this application, the multi-link device may allow services of a same access category (access category, AC) to be transmitted on different links, and even allow a same data packet to be transmitted on different links; or may not allow services of a same access category to be transmitted on different links, but allow services of different access categories to be transmitted on different links.

A frequency band in which the multi-link device works may include one or more of frequency bands of sub 1 GHz, 2.4 GHz, 5 GHz, 6 GHz, and a high frequency 60 GHz.

The foregoing content describes the system architecture and/or application scenario of the channel access method for a multi-link device provided in the embodiments of this application. The following describes in detail the channel access method for a multi-link device provided in the embodiments of this application, with reference to more accompanying drawings.

Optionally, the multi-link device in the embodiments of this application may be the non-AP MLD in FIG. 2, or may be the AP MLD in FIG. 2. This is not limited in the embodiments of this application.

Optionally, the multi-link device mentioned in the embodiments of this application does not support STR on two links. It can be understood that "supporting STR" in this application may mean that the device has an STR capability, and uses the STR capability in current communication; "not supporting STR" may mean that the device does not have an STR capability, or may mean that the device has an STR capability but does not use the STR capability in current communication. It can be further understood that, in some cases, some links of the multi-link device may switch between STR and non-STR, that is, switch from supporting STR to not supporting STR, or switch from not supporting STR to supporting STR.

Figure 4:
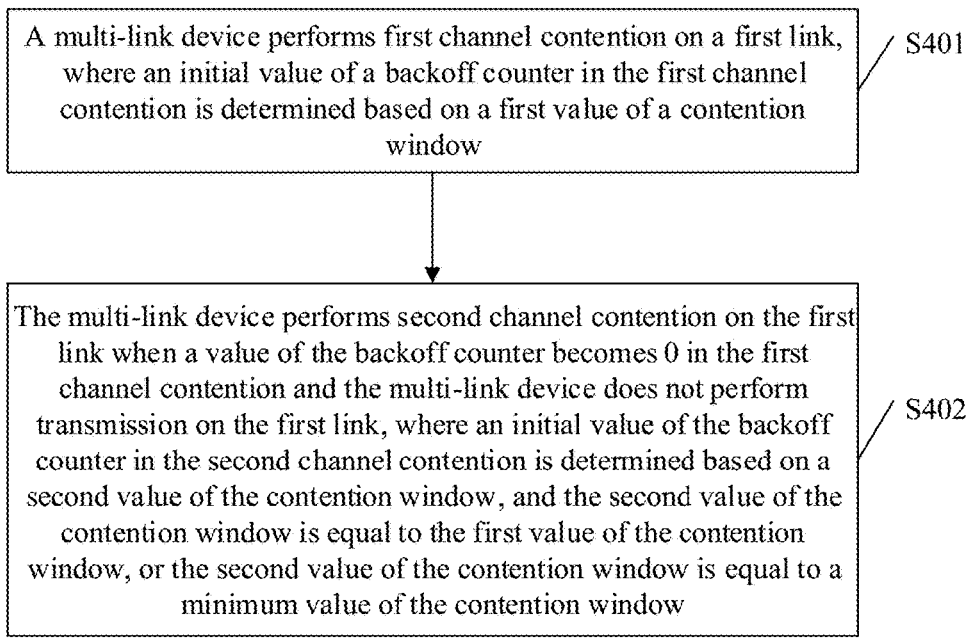
FIG. 4 is a schematic flowchart of a channel access method for a multi-link device according to an embodiment of this application.

FIG. 4 is a schematic flowchart of a channel access method for a multi-link device according to an embodiment of this application. As shown in FIG. 4, the channel access method for a multi-link device includes but is not limited to the following steps.

S401: The multi-link device performs first channel contention on a first link, where an initial value of a backoff counter in the first channel contention is determined based on a first value of a contention window.

Specifically, the multi-link device may perform the first channel contention on the first link, and may suspend the first link after the backoff counter backs off to 0, to wait for the multi-link device to perform channel contention on a second link. It can be understood that "suspending (suspend)" in this application may also be understood as "not performing transmission", and "suspending the first link" may mean that transmission is not performed on the first link.

Optionally, channel contention may include a carrier sense multiple access with collision avoidance (carrier sense multiple access with collision avoidance, CSMA/CA) mechanism or an enhanced distributed channel access (enhanced distributed channel access, EDCA) mechanism. To ensure that an access point and a station can access a wireless medium (wireless medium) without colliding with each other, the CSMA/CA mechanism is used in 802.11. The mechanism is also referred to as a distributed coordination function (distributed coordination function, DCF). The CSMA/CA mechanism is specifically as follows: Before sending data, a station needs to perform clear channel assess (clear channel access, CCA) on a wireless medium. If the wireless medium is idle in a period of time (for example, a distributed interframe space (distributed inter-frame space, DIFS)), the station may start a random backoff process. If the wireless medium is busy in the period of time, before starting a random backoff process, the station needs to wait until the wireless medium becomes idle and then remains idle for a period of time (such as a DIFS). After the random backoff process ends, the station may perform frame exchange. A backoff time (backoff time) in the random backoff process is equal to a product of a random backoff value and a slot (slot) time. The random backoff value is a value randomly selected from an evenly distributed contention window [0, CW]. It can be understood that the backoff time in the random backoff process is equal to an initial value of the backoff counter in channel contention.

Optionally, in the CSMA/CA mechanism, a contention window (contention window, CW) has a plurality of values, and when a station makes an initial attempt (Initial Attempt) of channel contention, a value of the CW is a minimum value, namely, CWmin. Each time transmission fails (for example, a collision occurs), retransmission (retransmission) needs to be performed, and channel contention is performed again. In this case, the value of the CW successively increases until reaching a maximum value of the CW, namely, CWmax. When data is successfully sent/transmission succeeds, the CW is reset (reset) to CWmin.

The EDCA mechanism is an enhancement of the DCF, and allows services of different access categories to have different EDCA parameter sets. An EDCA parameter set includes parameters such as CWmin, CWmax, and an arbitration inter-frame space (arbitration inter-frame space, AIFS). EDCA parameters of different access categories are listed in Table 1, where AC_VO indicates that an access category is a voice (voice) flow, AC_VI indicates that an access category is a video (video) flow, AC_BE indicates that an access category is a best effort (best effort) flow, and AC_BK indicates that an access category is a background (background) flow.

TABLE 1

| AC (access category) | CWmin | CWmax | AIFSN (arbitration interframe spacing number) |
|---|---|---|---|
| AC_BK | 31 | 1023 | 7 |
| AC_BE | 31 | 1023 | 3 |
| AC_VI | 15 | 31 | 2 |
| AC_VO | 7 | 15 | 2 |
| Legacy (legacy) | 15 | 1023 | 2 |

EDCA parameters of different access categories

A random backoff process of a service of a specific access category is basically the same as that of the DCF. A difference lies in that an AIFS replaces a DIFS in the DCF.

In other words, when a channel returns to an idle state, the channel needs to remain idle in an AIFS before a random backoff process can be performed. An AIFS calculation method may be obtaining a sum of a short interframe space (short inter-frame space, SIF S) and a product of an arbitration interframe spacing number (AIFS number, AIFSN) and a slot time (a Slot Time), that is, AIFS[AC]=a SIFS time+AIFSN[AC]*(a slot time). It can be understood that units of both an AIFS and an SIFS are time units.

Optionally, the foregoing first channel contention may be CSMA/CA or EDCA. The initial value of the backoff counter in the first channel contention may be determined based on the first value of the contention window. In a channel contention process, a value of the backoff counter decreases from the initial value until the value of the backoff counter becomes 0. It can be understood that the first value may be CWmin if the multi-link device attempts channel contention on the first link for the first time. If it is not the first time that the multi-link device attempts channel contention on the first link, the first value of the contention window is determined according to a CW change rule in the CSMA/CA mechanism, to be specific, the value of the CW successively increases if transmission fails, and the value of the CW is set to CWmin if transmission succeeds.

S402: The multi-link device performs second channel contention on the first link when the value of the backoff counter becomes 0 in the first channel contention and the multi-link device does not perform transmission on the first link, where an initial value of the backoff counter in the second channel contention is determined based on a second value of the contention window, and the second value of the contention window is equal to the first value of the contention window, or the second value of the contention window is equal to the minimum value of the contention window.

Specifically, after the value of the backoff counter backs off to 0 in the first channel contention, if a backoff counter on the second link has not yet backed off (backoff) to 0, the multi-link device does not perform transmission on the first link, but waits for channel contention on the second link. When a time for which the first link waits for channel contention on the second link exceeds a preset time, if a state of the second link is still a busy state, it indicates that the second link is in the busy state for a long time, and the multi-link device may quit performing parallel transmission on the first link and the second link. In this case, the multi-link device may perform the second channel contention on the first link, and may transmit data on the first link after the backoff counter backs off to 0 in the second channel contention. Alternatively, after the value of the backoff counter becomes 0 in the first channel contention, if a length of a network allocation vector (network allocation vector, NAV) in a data packet received by the multi-link device on the second link exceeds a preset time, it indicates that a comparatively long NAV is set on the second link, and the multi-link device may also quit performing parallel transmission on the first link and the second link. In this case, the multi-link device may perform the second channel contention on the first link, and may transmit data on the first link after the backoff counter backs off to 0 in the second channel contention. The multi-link device does not support simultaneous transmit and receive, that is, is non-STR, between the first link and the second link.

It can be understood that "data transmission" and "transmit data" mentioned in this application generally refer to communication, where "data" generally refers to communication information, and is not limited to data information, but may alternatively be signaling information or the like.

It can be understood that the first channel contention and the second channel contention are named to distinguish between the two times of channel contention. In actual application, the two times of channel contention (namely, the first channel contention and the second channel contention) may comply with a same channel contention mechanism. For example, both the two times of channel contention (namely, the first channel contention and the second channel contention) comply with the CSMA/CA mechanism, or both the two times of channel contention comply with the EDCA channel contention mechanism.

Figure 5A:
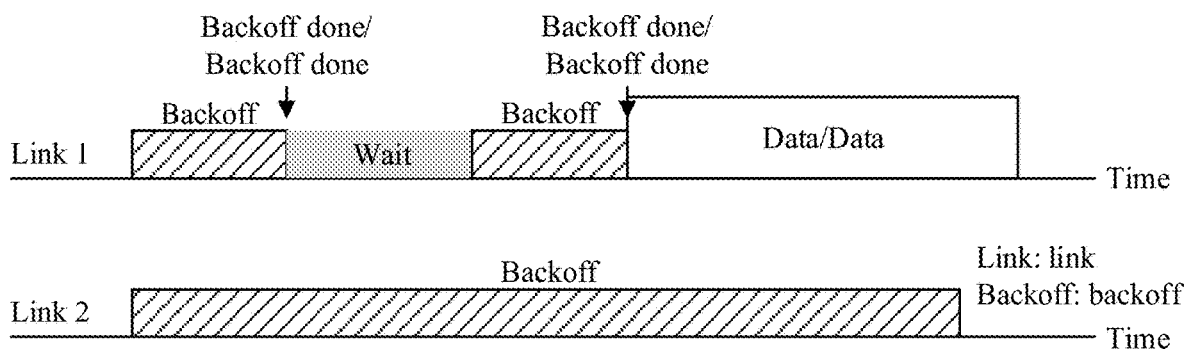
FIG. 5a is a schematic diagram of a first time sequence of multi-link channel access according to an embodiment of this application.

In an example, FIG. 5a is a schematic diagram of a first time sequence of multi-link channel access according to an embodiment of this application. As shown in FIG. 5a, the first link is a link 1, and the second link is a link 2. The multi-link device performs channel contention on the two links (the link 1 and the link 2). It is assumed that the multi-link device first backs off (backoff) to 0 on the link 1. In this case, the multi-link device suspends the link 1, and waits to perform channel contention on the link 2. When the backoff counter on the link 2 cannot back off (backoff) to 0 for a long time, the multi-link device quits transmitting data in parallel on the link 1 and the link 2. Then, the multi-link device may perform channel contention on the link 1 again, and transmit data on the link 1 after the backoff counter backs off to 0 in this channel contention.

Optionally, the initial value of the backoff counter in the first channel contention may be determined based on the first value of the contention window, and the initial value of the backoff counter in the second channel contention is determined based on the second value of the contention window. Because the multi-link device does not transmit data, that is, does not perform frame exchange, on the first link after performing the first channel contention on the first link and backing off to 0, the multi-link device cannot determine whether the first channel contention on the first link succeeds. Therefore, in a process of performing the second channel contention on the first link, the multi-link device may keep the value of the contention window unchanged, in other words, the value of the CW neither increases nor decreases, which means that the second value of the CW is equal to the first value. Alternatively, in a process of performing the second channel contention on the first link, the multi-link device sets the value of the contention window to the minimum value, namely, CWmin.

It can be understood that a larger contention window in a channel contention process indicates a lower contention collision probability and a longer backoff time; and a smaller contention window indicates a shorter backoff time and a higher contention collision probability. Therefore, in this embodiment of this application, when the multi-link device backs off to 0 on a link but does not perform transmission on the link, balance between a backoff time and a contention collision probability can be achieved by performing channel contention/channel access on the link again, and setting the value of the contention window to remain unchanged or setting the value of the contention window to the minimum value CWmin.

Optionally, after the value of the backoff counter backs off to 0 in the first channel contention, that is, after the backoff counter backs off to 0 on the first link, the multi-link device may detect a state of the first link in a first time period. If the state of the first link in the first time period is an idle state, it indicates that no collision will occur if transmission is performed on the first link. In this case, it is predicted that transmission on the first link can succeed. Then, in a process of performing the second channel contention on the first link, the multi-link device may use a value (namely, the first value) of the contention window in a previous channel contention process on the same link as a value (namely, the second value) of the contention window in a current channel contention process; or may set a value (namely, the second value) of the contention window in a current channel contention process to the minimum value, namely, CWmin, of the contention window; or may set a value (namely, the second value) of the contention window in a current channel contention process to half of a value (namely, the first value) of the contention window in a previous channel contention process, where the second value is specifically the first value minus 1, divided by 2, that is, CW=(CW−1)/2.

If the state of the first link in the first time period is a busy state, it indicates that a collision will occur if transmission is performed on the first link. In this case, it is predicted that transmission on the first link will fail. Then, in a process of performing the second channel contention on the first link, the multi-link device may increase a value (namely, the first value) of the contention window in a previous channel contention process on the same link and use an increased value as a value (namely, the second value) of the contention window in a current channel contention process, in other words, the second value is greater than the first value. Specifically, the second value may be twice the first value, plus 1, that is, CW=2*CW+1. The first time period may be a clear channel assessment time (a CCA time), for example, 4 μs (microseconds) or 9 μs.

Optionally, after the value of the backoff counter backs off to 0 in the first channel contention, that is, after the backoff counter backs off to 0 on the first link, the multi-link device may perform receiving on the first link. If a frame is received within a preset time, and it is determined, based on information in the frame, that the frame is sent by a station in a local cell, it is predicted that transmission on the first link will fail. If no frame is received within a preset time, or a frame is received within a preset time, and it is determined, based on information in the frame, that the frame is not sent by a station in a local cell, it may be predicted that transmission on the first link will succeed. If it is predicted that transmission on the first link succeeds, in a process of performing the second channel contention on the first link, the multi-link device may keep the value of the contention window unchanged (the second value is equal to the first value), or set the value of the contention window to the minimum value CWmin, or set the value of the contention window to half of the value of the contention window in the process of the first channel contention (the second value is equal to the first value minus 1, divided by 2), that is, CW=(CW−1)/2. If it is predicted that transmission on the first link fails, in a process of performing the second channel contention on the first link, the multi-link device may increase the value of the contention window in the process of the first channel contention and use the increased value as the value of the contention window in the process of the second channel contention, in other words, the second value is greater than the first value. Specifically, the second value may be twice the first value, plus 1, that is, CW=2*CW+1.

It can be understood that, in this embodiment of this application, after the backoff counter backs off to 0 in the first channel contention, the state of the first link is determined, to estimate whether transmission on the first link succeeds, and the value of the contention window is set based on an estimation result. In this way, a size of the contention window can be adjusted more accurately and properly, thereby further balancing a backoff time and a contention collision probability.

Optionally, before the multi-link device performs the second channel contention on the first link, the multi-link device performs channel contention on the second link, and detects a state of the first link when a value of the backoff counter becomes 0 in the channel contention. If the state of the first link is the busy state, the multi-link device may not wait for the first link, and the multi-link device transmits data on the second link. The multi-link device performs the second channel contention on the first link after the state of the first link changes from the busy state to the idle state. The multi-link device transmits data on the first link after the value of the backoff counter becomes 0 in the second channel contention.

Figure 5B:
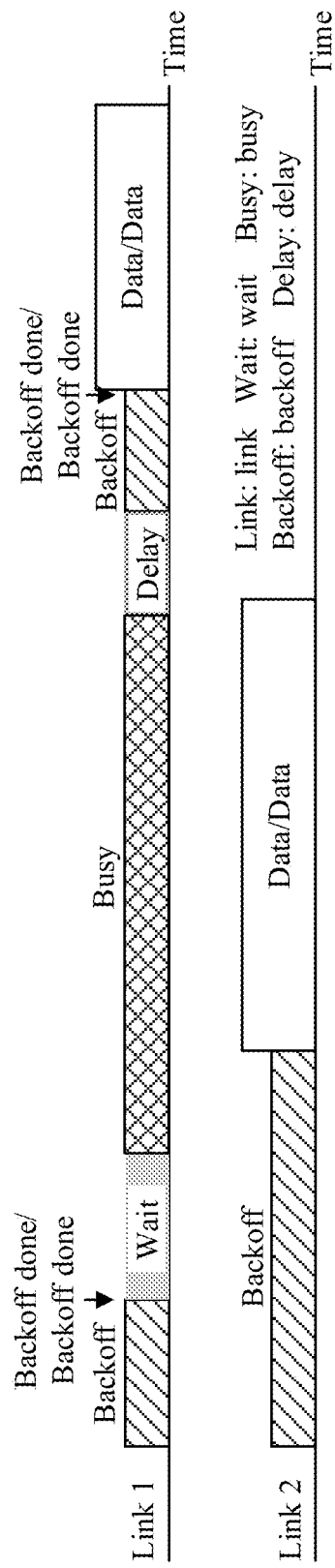
FIG. 5b is a schematic diagram of a second time sequence of multi-link channel access according to an embodiment of this application.

In an example, FIG. 5b is a schematic diagram of a second time sequence of multi-link channel access according to an embodiment of this application. As shown in FIG. 5b, the first link is a link 1, and the second link is a link 2. The multi-link device performs channel contention on the two links (the link 1 and the link 2). It is assumed that the multi-link device first backs off to 0 on the link 1. In this case, the multi-link device suspends the link 1, and waits to perform channel contention on the link 2. If a state of the link 1 changes to a busy state in a waiting process of the link 1, and the state of the link 1 is still the busy state after the backoff counter on the link 2 backs off to 0, assuming that the multi-link device quits transmitting data in parallel on the link 1 and the link 2, that is, does not wait for parallel transmission on the link 1 and the link 2, the multi-link device may transmit data on the link 2 after the backoff counter on the link 2 backs off to 0. After the state of the link 1 returns to an idle state, the multi-link device may perform channel contention on the link 1 again, and transmit data on the link 1 after the backoff counter backs off to 0 in this channel contention.

It can be understood that, in this embodiment of this application, after the multi-link device backs off to 0 on the first link, in a process of waiting for channel contention on the second link, the state of the first link changes to the busy state, and when the multi-link device backs off to 0 on the second link, the first link is still in the busy state; in this case, directly transmitting data on the second link can improve channel utilization.

Optionally, before the multi-link device performs the second channel contention on the first link, the multi-link device performs channel contention on the second link, and detects a state of the first link when a value of the backoff counter becomes 0 in the channel contention. If the state of the first link is the busy state, the multi-link device may suspend the second link, that is, the multi-link device does not perform transmission on the second link. The multi-link device performs the second channel contention on the first link when the state of the first link changes from the busy state to the idle state.

Optionally, the multi-link device may detect a state of the second link when the value of the backoff counter becomes 0 in the second channel contention. If the state of the second link is an idle state, the multi-link device may transmit data in parallel on the first link and the second link.

Figure 5C:
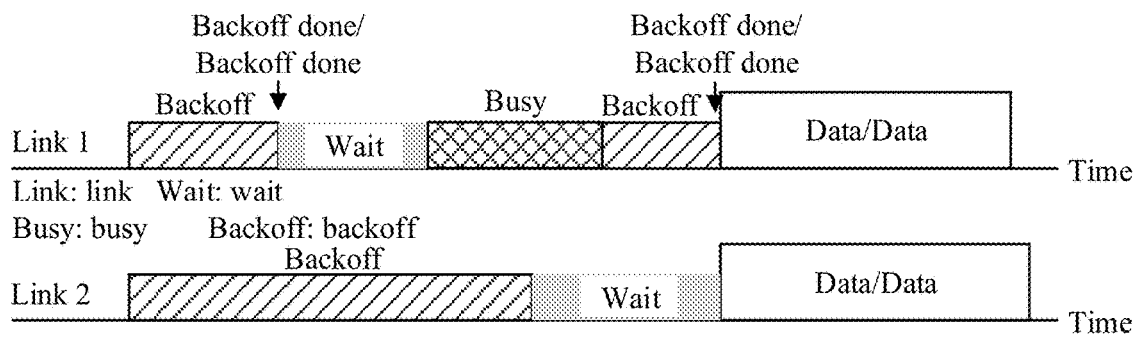
FIG. 5c is a schematic diagram of a third time sequence of multi-link channel access according to an embodiment of this application.

In an example, FIG. 5c is a schematic diagram of a third time sequence of multi-link channel access according to an embodiment of this application. As shown in FIG. 5c, the first link is a link 1, and the second link is a link 2. The multi-link device performs channel contention on the two links (the link 1 and the link 2). It is assumed that the multi-link device first backs off to 0 on the link 1. In this case, the multi-link device suspends the link 1, and waits to perform channel contention on the link 2. If a state of the link 1 changes to a busy state in a waiting process of the link 1, and the state of the link 1 is still the busy state after the backoff counter on the link 2 backs off to 0, assuming that the multi-link device determines to still transmit data in parallel on the link 1 and the link 2, that is, wait for parallel transmission on the link 1 and the link 2, the multi-link device may suspend the link 2 after the backoff counter on the link 2 backs off to 0. After the state of the link 1 returns to an idle state, the multi-link device performs channel contention on the link 1 again, and detects a state of the link 2 after the backoff counter backs off to 0 in this channel contention. If the state of the link 2 is an idle state, the multi-link device transmits data in parallel on the link 1 and the link 2.

It can be understood that, in this embodiment of this application, after the multi-link device backs off to 0 on the first link, in a process of waiting for channel contention on the second link, the state of the first link changes to the busy state, and when the multi-link device backs off to 0 on the second link, the first link is still in the busy state; after the state of the first link returns to the idle state, the multi-link device performs channel contention on the first link again, and after backing off to 0, transmit data in parallel on the first link and the second link. In this way, a peak transmission rate can be increased.

In this embodiment of this application, the multi-link device performs channel contention on the two links. After the value of the backoff counter on one link (namely, the first link) backs off to 0, the multi-link device suspends the link, and waits for channel contention on the other link (namely, the second link). If the backoff counter on the other link cannot back off to 0 for a long time, the multi-link device performs channel contention (namely, the second channel contention) on the first link again. A value of the contention window in this channel contention process (namely, the second channel contention) is equal to a value of the contention window in a previous channel contention process (namely, the first channel contention) on the first link. In other words, the value of the contention window does not change in the process of the first channel contention and the process of the second channel contention. Alternatively, a value of the contention window in this channel contention process (namely, the second channel contention) is equal to the minimum value CWmin of the contention window. In this embodiment of this application, when the multi-link device backs off to 0 on a link but does not perform transmission on the link, balance between a backoff time and a contention collision probability can be achieved by performing channel contention/channel access on the link again, and setting the value of the contention window to remain unchanged or setting the value of the contention window to the minimum value CWmin.

In an optional embodiment, the multi-link device performs the first channel contention on the first link, and after the value of the backoff counter backs off to 0 in the first channel contention, suspends the first link, that is, does not perform transmission on the first link. The multi-link device performs channel contention on the second link, and detects the state of the first link after the value of the backoff counter backs off to 0 during the channel contention. If the state of the first link is the idle state, the multi-link device transmits data in parallel on the first link and the second link.

Optionally, a method for detecting the state of the first link includes: The multi-link device detects whether the state of the first link is always the idle state in a period of time (for example, a point coordination function (point coordinate function, PCF) interframe space (PCF inter frame space, PIFS)) before the value of the backoff counter backs off to 0 during the channel contention on the second link. If the state of the first link is the idle state in the period of time (PIFS), the multi-link device determines that the state of the first link is the idle state. It can be understood that, similarly, the state of the second link may also be detected according to this method. Details are not described herein again.

Figure 5D:
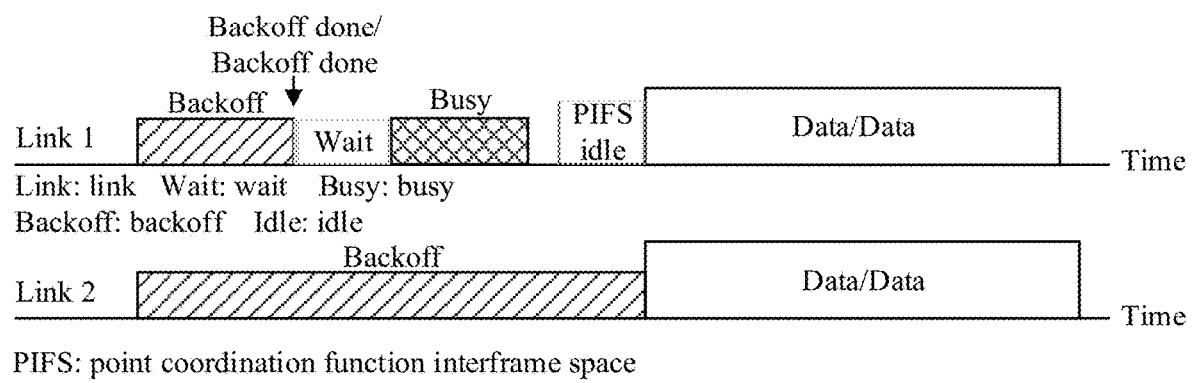
FIG. 5d is a schematic diagram of a fourth time sequence of multi-link channel access according to an embodiment of this application.

In an example, FIG. 5d is a schematic diagram of a fourth time sequence of multi-link channel access according to an embodiment of this application. As shown in FIG. 5d, the first link is a link 1, and the second link is a link 2. The multi-link device performs channel contention on the two links (the link 1 and the link 2). It is assumed that the multi-link device first backs off to 0 on the link 1. In this case, the multi-link device suspends the link 1, and waits to perform channel contention on the link 2. If a state of the link 1 once changed to a busy state in a backoff process of the link 2, and the state of the link 1 already returns to an idle state when the backoff counter on the link 2 backs off to 0, the multi-link device transmits data in parallel on the link 1 and the link 2.

Figure 6:
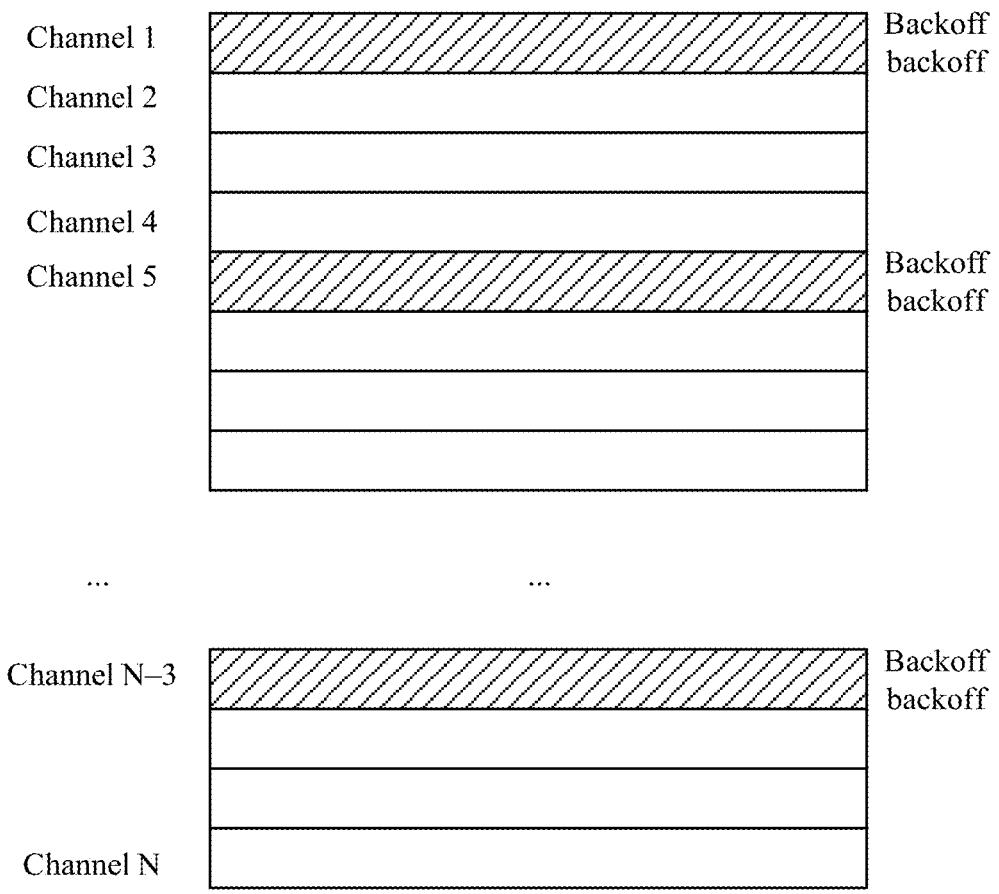
FIG. 6 is a schematic diagram of single-link multi-channel according to an embodiment of this application.

In another optional embodiment, the channel access method for a multi-link device provided in this application may also be applied to a single-link multi-channel access scenario. FIG. 6 is a schematic diagram of single-link multi-channel according to an embodiment of this application. As shown in FIG. 6, a single link may include N channels, where a channel 1, a channel 5, . . . , and a channel N−3 are configured as channels used for channel access. The first link and the second link may correspond to a first channel (for example, the channel 1) and a second channel (for example, the channel 5) in a single-link multi-channel access scenario. Specifically, a communication device performs first channel contention on the first channel, where an initial value of a backoff counter in the first channel contention is determined based on a first value of a contention window; and the communication device performs second channel contention on the first channel if a value of the backoff counter becomes 0 in the first channel contention and the communication device does not transmit data on the first channel, where an initial value of the backoff counter in the second channel contention is determined based on a second value of the contention window. The second value of the contention window is equal to the first value of the contention window, or the second value of the contention window is equal to the minimum value of the contention window.

After the value of the backoff counter becomes 0 in the first channel contention, the communication device suspends the first channel, that is, does not transmit data on the first channel, and waits for channel contention on the second channel. When a time for which the first channel waits for channel contention on the second channel exceeds a preset time, a state of the second channel is still a busy state, indicating that a backoff counter on the second channel cannot back off to 0 for a long time. In this case, the multi-channel device performs channel contention on the first channel again, that is, the multi-channel device performs the second channel contention on the first channel. Alternatively, after the value of the backoff counter becomes 0 in the first channel contention, the multi-channel device receives a data packet on the second channel, and a length of the data packet exceeds a preset time. It indicates that a comparatively long network allocation vector is set on the second channel. In this case, the multi-channel device performs channel contention on the first channel again, that is, the multi-channel device performs the second channel contention on the first channel.

In still another optional embodiment, if a multi-link device determines that all potential receiving stations (that is, receiving parties of buffered data) on a link are affiliated to a non-STR MLD, and all the potential receiving stations cannot perform receiving due to inter-link interference, the multi-link device may suspend (suspend) channel contention on the link, that is, stop backoff, or perform no transmission if the multi-link device has backed off to 0 on the link. When one or more potential receiving stations on the link can perform receiving, the multi-link device performs channel contention on the link again. A value of the contention window that is used when the multi-link device performs channel contention on the link again is the same as a value of the contention window when the multi-link device last performs channel contention on the link. Alternatively, a value of the contention window that is used when the multi-link device performs channel contention on the link again is a minimum value, namely, CWmin.

The foregoing content describes in detail the methods provided in this application. To better implement the foregoing solutions in the embodiments of this application, the embodiments of this application further provide corresponding apparatuses or devices.

In the embodiments of this application, the multi-link device may be divided into functional modules based on the method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example and is merely logical function division, and may be other division during actual implementation.

Figure 7:
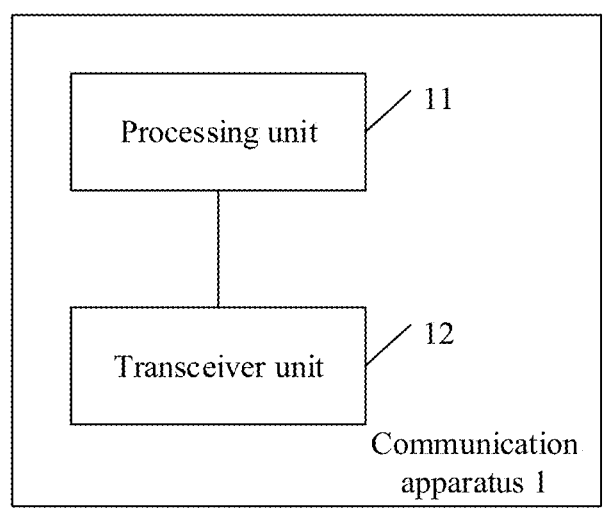
FIG. 7 is a schematic diagram of a structure of a communication apparatus according to an embodiment of this application.

When an integrated unit is used, FIG. 7 is a schematic diagram of a structure of a communication apparatus according to an embodiment of this application. The communication apparatus 1 may be a multi-link device, or a chip, such as a Wi-Fi chip, in a multi-link device. As shown in FIG. 7, the communication apparatus 1 includes a processing unit 11.

The processing unit 11 is configured to perform first channel contention on a first link, where an initial value of a backoff counter in the first channel contention is determined based on a first value of a contention window. The processing unit is further configured to perform second channel contention on the first link when a value of the backoff counter becomes 0 in the first channel contention and the multi-link device does not perform transmission on the first link. An initial value of the backoff counter in the second channel contention is determined based on a second value of the contention window. The second value of the contention window is equal to the first value of the contention window, or the second value of the contention window is equal to a minimum value of the contention window.

Optionally, that the multi-link device does not perform transmission on the first link includes: when a time for which the first link waits for channel contention on a second link exceeds a preset time, a state of the second link is a busy state.

Optionally, that the multi-link device does not perform transmission on the first link includes: after the value of the backoff counter becomes 0 in the first channel contention, a length of a data packet received by the multi-link device on a second link exceeds a preset time.

Optionally, simultaneous transmit and receive STR is not supported between the first link and the second link.

Optionally, the processing unit 11 is further configured to: detect a state of the first link in a first time period; and when the state of the first link in the first time period is an idle state, determine the first value of the contention window as the second value, or determine the second value of the contention window as the minimum value of the contention window.

Optionally, the processing unit 11 is further configured to: perform channel contention on the second link, and detect a state of the first link when a value of the backoff counter becomes 0 in the channel contention; and suspend the second link when the state of the first link is a busy state. The processing unit 11 is configured to perform the second channel contention on the first link when the state of the first link changes from the busy state to the idle state.

Optionally, the communication apparatus further includes a transceiver unit 12. The processing unit 11 is further configured to detect, for the multi-link device, a state of the second link when a value of the backoff counter becomes 0 in the second channel contention. The transceiver unit 12 is configured to transmit data in parallel on the first link and the second link when the state of the second link is an idle state.

Optionally, the processing unit 11 is further configured to perform channel contention on the second link, and detect a state of the first link when a value of the backoff counter becomes 0 in the channel contention. The transceiver unit 12 is configured to transmit data on the second link when the state of the first link is a busy state.

The communication apparatus 1 in this embodiment of this application has any function of the multi-link device in the foregoing method. Details are not described herein again.

The foregoing describes the multi-link device in the embodiments of this application, and the following describes possible product forms of the multi-link device. It should be understood that any form of product with functions of the multi-link device in FIG. 7 falls within the protection scope of the embodiments of this application. It should be further understood that the following descriptions are merely examples, and a product form of the multi-link device in the embodiments of this application is not limited thereto.

In a possible product form, the multi-link device in the embodiments of this application may be implemented by using a general bus architecture.

The multi-link device includes a processor. The processor is configured to: perform first channel contention on a first link, where an initial value of a backoff counter in the first channel contention is determined based on a first value of a contention window; and perform second channel contention on the first link when a value of the backoff counter becomes 0 in the first channel contention and the multi-link device does not perform transmission on the first link, where an initial value of the backoff counter in the second channel contention is determined based on a second value of the contention window, and the second value of the contention window is equal to the first value of the contention window, or the second value of the contention window is equal to a minimum value of the contention window.

Optionally, the multi-link device may further include a memory, and the memory is configured to store instructions executed by the processor. Optionally, the multi-link device may further include a transceiver internally connected to and communicating with the processor. The transceiver is configured to support communication between the multi-link device and another device, for example, transmit data in parallel on the first link and a second link when a state of the second link is an idle state, or transmit data on a second link when a state of the first link is a busy state.

In a possible product form, the multi-link device in the embodiments of this application may be implemented by using a general purpose processor.

The general purpose processor for implementing the multi-link device includes a processing circuit. The processing circuit is configured to: perform first channel contention on a first link, where an initial value of a backoff counter in the first channel contention is determined based on a first value of a contention window; and perform second channel contention on the first link when a value of the backoff counter becomes 0 in the first channel contention and the multi-link device does not perform transmission on the first link, where an initial value of the backoff counter in the second channel contention is determined based on a second value of the contention window, and the second value of the contention window is equal to the first value of the contention window, or the second value of the contention window is equal to a minimum value of the contention window.

Optionally, the general purpose processor may further include a storage medium, and the storage medium is configured to store instructions to be executed by the processing circuit. Optionally, the general purpose processor may further include an input/output interface internally connected to and communicating with the processing circuit. The input/output interface is configured to support communication between the general purpose processor and another device, for example, transmit data in parallel on the first link and a second link when a state of the second link is an idle state, or transmit data on a second link when a state of the first link is a busy state.

In a possible product form, the multi-link device in the embodiments of this application may be alternatively implemented by using the following: one or more FPGAs (field programmable gate arrays), a PLD (programmable logic device), a controller, a state machine, gate logic, a discrete hardware component, any other suitable circuit, or any combination of circuits capable of performing various functions described throughout this application.

It should be understood that communication apparatuses in the foregoing various product forms have any function of the multi-link device in the foregoing method embodiments, and details are not described herein again.

An embodiment of this application further provides a computer-readable storage medium. The computer-readable storage medium stores computer program code. When the foregoing processor executes the computer program code, an electronic device performs the method in the foregoing embodiments.

An embodiment of this application further provides a computer program product. When the computer program product runs on a computer, the computer is enabled to perform the method in the foregoing embodiments.

An embodiment of this application further provides a communication apparatus. The apparatus may exist in a product form of a chip. A structure of the apparatus includes a processor and an interface circuit. The processor is configured to communicate with another apparatus by using the interface circuit, so that the apparatus performs the method in the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well known in the art. For example, a storage medium is coupled to a processor, so that the processor can read information from the storage medium or write information into the storage medium. Certainly, the storage medium may alternatively be a component of the processor. The processor and the storage medium may be located in an ASIC. In addition, the ASIC may be located in a core network interface device. Certainly, the processor and the storage medium may alternatively exist as discrete components in a core network interface device.

A person skilled in the art should be aware that in one or more of the foregoing examples, the functions described in this application may be implemented by using hardware, software, firmware, or any combination thereof. When software is used to implement the functions, the functions may be stored in a computer-readable medium or transmitted as one or more instructions or code in the computer-readable medium. The computer-readable medium includes a computer-readable storage medium and a communication medium. The communication medium includes any medium that facilitates transmission of a computer program from one place to another. The storage medium may be any available medium accessible to a general-purpose or dedicated computer.

The objectives, technical solutions, and benefits of this application are further described in detail in the foregoing specific implementations. It should be understood that the foregoing descriptions are merely specific implementations of this application, but are not intended to limit the protection scope of this application. Any modification, equivalent replacement or improvement made based on technical solutions of this application shall fall within the protection scope of this application. Therefore, the protection scope of this application shall be subject to the protection scope of the claims.

What is claimed is:

1. A channel access method, comprising:
performing first channel contention on a first link, wherein an initial value of a backoff counter in the first channel contention is determined based on a first value of a contention window;
performing channel contention on a second link;
detecting a state of the first link when a value of a backoff counter becomes 0 in the channel contention on the second link;
suspending the second link in response to determining that the state of the first link is a busy state;
when the state of the first link changes from the busy state to an idle state, triggering second channel contention on the first link; and
performing the second channel contention on the first link when a value of the backoff counter becomes 0 in the first channel contention and when transmission is not performed on the first link, wherein an initial value of the backoff counter in the second channel contention is determined based on a second value of the contention window, and the second value of the contention window is equal to the first value of the contention window, or the second value of the contention window is equal to a minimum value of the contention window.

2. The channel access method according to claim 1, wherein the transmission is not performed on the first link when a state of the second link is a busy state, and wherein the state of the second link is the busy state when a time period for which the first link waits for channel contention on a second link exceeds a preset time period.

3. The channel access method according to claim 1, wherein that transmission is not performed on the first link comprises:
   after the value of the backoff counter becomes 0 in the first channel contention, a length of a data packet received on a second link exceeds a preset time period.

4. The channel access method according to claim 1, wherein simultaneous transmit and receive (STR) is not supported between the first link and the second link.

5. The channel access method according to claim 1, wherein before the performing second channel contention on the first link, the channel access method further comprises:
   detecting a state of the first link in a first time period; and
   in response to determining that the state of the first link in the first time period is an idle state, determining the first value of the contention window as the second value, or determining the second value of the contention window as the minimum value of the contention window.

6. The channel access method according to claim 1, wherein after the performing second channel contention on the first link, the channel access method further comprises:
   detecting a state of the second link when a value of the backoff counter becomes 0 in the second channel contention; and
   transmitting data in parallel on the first link and the second link in response to determining that the state of the second link is an idle state.

7. An apparatus, comprising:
   at least one processor; and
   one or more memories coupled to the at least one processor and storing programming instructions for execution by the at least one processor to:
      perform first channel contention on a first link, wherein an initial value of a backoff counter in the first channel contention is determined based on a first value of a contention window;
      perform channel contention on a second link;
      detect a state of the first link when a value of a backoff counter becomes 0 in the channel contention on the second link;
      suspend the second link in response to determining that the state of the first link is a busy state;
      when the state of the first link changes from the busy state to an idle state, trigger second channel contention on the first link; and
      perform the second channel contention on the first link when a value of the backoff counter becomes 0 in the first channel contention and when transmission is not performed on the first link, wherein an initial value of the backoff counter in the second channel contention is determined based on a second value of the contention window, and the second value of the contention window is equal to the first value of the contention window, or the second value of the contention window is equal to a minimum value of the contention window.

8. The apparatus according to claim 7, wherein the transmission is not performed on the first link when a state of the second link is a busy state, and wherein the state of the second link is the busy state when a time period for which the first link waits for channel contention on a second link exceeds a preset time period.

9. The apparatus according to claim 7, wherein after the value of the backoff counter becomes 0 in the first channel contention, a length of a data packet received on a second link exceeds a preset time period.

10. The apparatus according to claim 7, wherein simultaneous transmit and receive (STR) is not supported between the first link and the second link.

11. The apparatus according to claim 7, wherein the one or more memories store the programming instructions for execution by the at least one processor to:
    detect a state of the first link in a first time period; and
    in response to determining that the state of the first link in the first time period is an idle state, determine the first value of the contention window as the second value, or determine the second value of the contention window as the minimum value of the contention window.

12. The apparatus according to claim 7, wherein the one or more memories store the programming instructions for execution by the at least one processor to:
    detect a state of the second link when a value of the backoff counter becomes 0 in the second channel contention; and
    transmit data in parallel on the first link and the second link in response to determining that the state of the second link is an idle state.

13. A non-transitory computer-readable storage medium, wherein the non-transitory computer-readable storage medium stores instructions for execution by at least one processor to:
    perform first channel contention on a first link, wherein an initial value of a backoff counter in the first channel contention is determined based on a first value of a contention window;
    performing channel contention on a second link;
    detecting a state of the first link when a value of a backoff counter becomes 0 in the channel contention on the second link;
    suspending the second link in response to determining that the state of the first link is a busy state;
    when the state of the first link changes from the busy state to an idle state, triggering second channel contention on the first link; and
    perform the second channel contention on the first link when a value of the backoff counter becomes 0 in the first channel contention and when transmission is not performed on the first link, wherein an initial value of the backoff counter in the second channel contention is determined based on a second value of the contention window, and the second value of the contention window is equal to the first value of the contention window, or the second value of the contention window is equal to a minimum value of the contention window.

14. The non-transitory computer-readable storage medium according to claim 13, wherein simultaneous transmit and receive (STR) is not supported between the first link and the second link.

15. The non-transitory computer-readable storage medium according to claim 13, wherein the non-transitory computer-readable storage medium stores the instructions for execution by the at least one processor to:
    detect a state of the first link in a first time period; and
    in response to determining that the state of the first link in the first time period is an idle state, determine the first value of the contention window as the second value, or determine the second value of the contention window as the minimum value of the contention window.

16. The non-transitory computer-readable storage medium according to claim 13, wherein the non-transitory computer-readable storage medium stores the instructions for execution by the at least one processor to:
- detect a state of the second link when a value of the backoff counter becomes 0 in the second channel contention; and
- transmit data in parallel on the first link and the second link in response to determining that the state of the second link is an idle state.

\* \* \* \* \*